US011287314B1

(12) United States Patent
Cobb

(10) Patent No.: US 11,287,314 B1
(45) Date of Patent: Mar. 29, 2022

(54) METHOD FOR EVALUATING ARTIFICIAL LIGHTING OF A SURFACE

(71) Applicant: Roof Asset Management USA, Ltd., Brunswick, OH (US)

(72) Inventor: Joseph C. Cobb, Medina, OH (US)

(73) Assignee: Roof Asset Management USA Ltd., Brunswick, OH (US)

( * ) Notice: Subject to any disclaimer, the term of this patent is extended or adjusted under 35 U.S.C. 154(b) by 0 days.

(21) Appl. No.: 17/417,578

(22) PCT Filed: Feb. 26, 2021

(86) PCT No.: PCT/US2021/019762
§ 371 (c)(1),
(2) Date: Jun. 23, 2021

(87) PCT Pub. No.: WO2021/188277
PCT Pub. Date: Sep. 23, 2021

Related U.S. Application Data

(60) Provisional application No. 62/990,487, filed on Mar. 17, 2020.

(51) Int. Cl.
*G01J 1/08* (2006.01)
*G01J 1/42* (2006.01)

(52) U.S. Cl.
CPC .. *G01J 1/08* (2013.01); *G01J 1/42* (2013.01)

(58) Field of Classification Search
CPC ........ G01C 11/04; G06V 20/13; G06V 20/17; G06V 20/176; H04N 7/18; G01J 1/4228; G01J 2001/4247; G06K 9/00
(Continued)

(56) References Cited

U.S. PATENT DOCUMENTS 6,885,460 B2* 4/2005 Morita ............... G01B 11/2441
356/514
7,602,417 B2* 10/2009 Ogasawara ...... H04N 5/232945
348/169
(Continued)

FOREIGN PATENT DOCUMENTS

WO 2016-131005 A1 8/2016

OTHER PUBLICATIONS

Levin, N et al. Remote sensing of night lights: a review and an outlook for the future. University of Exeter, Remote Sensing of Enviromnet, Dec. 10, 2019, pp. 1-113. pp. 2-4.
(Continued)

*Primary Examiner* — Isiaka O Akanbi
(74) *Attorney, Agent, or Firm* — Edwin A. Sisson, Attorney at Law, LLC; Jeffrey J. Banyas

(57) ABSTRACT

Described herein is a method of evaluating artificial lighting of a surface. The method may comprise measuring a first lumen output at a first location on the surface at a first altitude. The method may further comprise photographing the surface from a second altitude to obtain an aerial photograph of the surface comprising a plurality of pixels, each pixel of the plurality of pixels having a second lumen output, and performing an altitude adjustment on the second lumen output to obtain a third lumen output. The method may comprise dividing the aerial photograph into a plurality of zones, each zone corresponding to a section of the surface. The method may further comprise establishing a user-defined threshold lumen output for each zone of the plurality of zones, and identifying a percentage of the total number of pixels in each zone which meets or exceeds the user-defined threshold lumen output.

20 Claims, 3 Drawing Sheets

(58) Field of Classification Search
USPC .................... 356/45, 237.2–237.6, 601–613
See application file for complete search history.

(56) References Cited

U.S. PATENT DOCUMENTS

| | | | | |
|---|---|---|---|---|
| 9,041,930 | B1* | 5/2015 | Young ................. | G02B 21/244 |
| | | | | 356/419 |
| 10,222,341 | B2* | 3/2019 | Otaki .................. | H04N 5/2352 |
| 10,267,627 | B2* | 4/2019 | Du ....................... | G01B 11/25 |
| 10,341,573 | B1* | 7/2019 | Yang ................... | H04N 5/2354 |
| 10,414,514 | B1* | 9/2019 | Yang ................... | H04N 5/2351 |
| 11,136,138 | B2* | 10/2021 | Yang ................... | B60Q 1/085 |
| 2008/0059065 | A1 | 3/2008 | Strelow et al. | |
| 2008/0156619 | A1* | 7/2008 | Patel .................. | G01B 11/2513 |
| | | | | 198/502.2 |
| 2012/0188359 | A1* | 7/2012 | Karube ................ | G02B 21/00 |
| | | | | 348/79 |

OTHER PUBLICATIONS

Metcalf, Jeremy P. Detecting and characterizing nighttime lighting using multispectral and hyperspeclral imaging. Naval Postgraduate School, Dec. 2012, pp. 1-61. pp. 17-22.
Jonathan P. Dandois et al. High spatial resolution three-dimensional mapping of vegetation spectral dynamics using computer vision. Remote Sensing of Environment 136, Jun. 5, 2013, pp. 259-275. pp. 266-275.

* cited by examiner

METHOD FOR EVALUATING ARTIFICIAL LIGHTING OF A SURFACE

CROSS REFERENCES AND PRIORITIES

This application claims priority from International Application No. PCT/US2021/019762 filed on 26 Feb. 2021 and U.S. Provisional Application No. 62/990,487 filed on 17 Mar. 2020 the teachings of each of which are incorporated by reference herein in their entirety.

BACKGROUND

The surfaces around the exterior of many residential, commercial, industrial, and other structures often require illumination by a variety of lighting elements. Lighting elements provide many benefits for pedestrian and vehicular traffic around the structures. For example, pedestrians walking through the areas around the exterior of a structure during evening time may require illumination to avoid obstacles such as cracks, potholes and the like which may cause accidents leading to physical injury.

Proper illumination of the surfaces around a structure also plays an important role in safety and security. Improperly illuminated surfaces around a structure often become havens for criminal activity such as drug trafficking, robbery, and assault.

Property owners often go to great lengths to evaluate for proper illumination of the surfaces around their structures. The most common method of evaluation involves an individual walking the area around the structure on foot during evening time and subjectively evaluating the adequacy of lighting. This approach is time consuming, inefficient, and can often miss improperly lighted areas due to the subjective nature of the evaluation.

Another approach to evaluating illumination of the area around a structure involves an individual walking the area around the structure on foot with a light meter which objectively measures the amount of reflected-light and or incident-light (either in lux, footcandles, candelas, lumens, or candela per square meter) at various points throughout the area. While the approach provides for a less subjective evaluation, the process of walking the area around the structure remains time consuming and inefficient.

The need exists, therefore, for an improved method for evaluating artificial lighting of a surface.

SUMMARY

A method of evaluating artificial lighting of a surface is disclosed. One step of the method may comprise measuring a first lumen output at a first location on the surface at a first altitude in a range of between 0.5 m and 6.5 m. Another step of the method may comprise photographing the surface from a second altitude in a range of between 60 m and 3,050 m to obtain an aerial photograph of the surface. The aerial photograph may comprise a plurality of pixels. Each pixel of the plurality of pixels may have an X coordinate and a Y coordinate corresponding to a specific spatial location of the pixel on the surface. Each pixel of the plurality of pixels may have a second lumen output. The X coordinate and the Y coordinate of at least one pixel of the plurality of pixels may correspond with the first location.

Another step of the method may comprise conducting an altitude adjustment on the second lumen output according to the formula $E_1=(d_1/d_2)^2 \times E_2$ to obtain a third lumen output. In the formula $E_1=(d_1/d_2)^2 \times E_2$, $E_1$ is the third lumen output, $d_1$ is the second altitude, $d_2$ is the first altitude, and $E_2$ is the first lumen output.

Another step in the method may comprise dividing the aerial photograph into a plurality of zones. Each zone may correspond to a section of the surface. Each zone may comprise a total number of pixels from the plurality of pixels.

Another step in the method may comprise establishing a user-defined threshold lumen output for each zone of the plurality of zones. The user-defined threshold lumen output for each zone may independently be in the range of between 10 lm/m² and 1,500 lm/m² when measured at the first altitude.

Another step in the method may comprise identifying a percentage of the total number of pixels in each zone of the plurality of zones which meet or exceed the user-defined threshold lumen output by comparing the third lumen output of each pixel to the first lumen output.

The step of measuring the first lumen output may occur at a first time. The step of photographing the surface from the second altitude may occur at a second time. The first time and the second time may be separated by no greater than +/−15 minutes.

In some embodiments, the first altitude may be in a range of between 1.2 m and 2.15 m. In certain embodiments, the second altitude may be in a range of between 450 m and 1,050 m.

In some embodiments, the first time and the second time may be separated by no greater than +/−1 minute. In certain embodiments, the first time and the second time are each after astronomical twilight and before astronomical dawn. In some such embodiments, the first time and the second time may be in a range of between at least 1 hour after astronomical twilight and at least 1 hour before astronomical dawn.

In some embodiments, the method may comprise the further step of taking at least one subsequent aerial photograph of the surface from the second altitude. The subsequent aerial photograph may comprise a subsequent plurality of pixels. Each pixel of the subsequent plurality of pixels may have an X coordinate and a Y coordinate corresponding to a specific spatial location of the pixel on the surface. Each pixel of the plurality of pixels may have a subsequent lumen output. The X coordinate and the Y coordinate of at least one pixel of the plurality of subsequent pixels may correspond with the first location.

In certain embodiments, the method may comprise the further step of conducting a subsequent altitude adjustment on the subsequent lumen output according to the formula $E_1=(d_1/d_2)^2 \times E_2$ to obtain a fourth lumen output. When conducting the subsequent altitude adjustment, in the formula $E_1=(d_1/d_2)^2 \times E_2$, $E_1$ is the fourth lumen output, $d_1$ is the second altitude, $d_2$ is the first altitude, and $E_2$ is the first lumen output.

In some embodiments, the method may comprise the further step of dividing the subsequent aerial photograph into a subsequent plurality of zones. Each zone may correspond to a section of the surface. Each zone may comprise a total number of pixels from the subsequent plurality of pixels.

In certain embodiments, the method may comprise the further step of identifying a percentage of the total number of pixels in each zone of the subsequent plurality of zones which meet or exceed the user-defined threshold lumen output by comparing the fourth lumen output of each subsequent pixel to the first lumen output.

The subsequent aerial photograph may be taken at a time which is in a range selected from the group consisting of between 12 hours and 10 years after the first time at which the first lumen output at the first location was measured, between 12 hours and 5 years after the first time at which the first lumen output at the first location was measured, between 12 hours and 3 years after the first time at which the first lumen output at the first location was measured, between 12 hours and 2 years after the first time at which the first lumen output at the first location was measured, and between 12 hours and 1 year after the first time at which the first lumen output at the first location was measured.

DETAILED DESCRIPTION

Disclosed herein is a method of evaluating artificial lighting of a surface. The method may include measuring a first lumen output at a first location on the surface. The first lumen output may be measured at "ground level". By "ground level" it is meant that the first lumen output is measured at a first altitude in a range of between 0.5 m and 6.5 m with a first altitude in the range of between 1.2 m and 2.15 m being preferred.

The first lumen output may be measured by any number of devices generally falling under the description of a light meter. The light meter may measure either the amount of reflected light or the amount of incident light and may measure in units of lux, footcandles, candelas, lumens, or candela per square meter. The preferred light meter for conducting the method measures reflected light in lumen per square meter ($lm/m^2$).

The first lumen output will preferably meet or exceed a user-defined threshold lumen output—as measured at the first altitude—for the first location. The user-defined threshold lumen output will vary depending upon a number of factors including the type of structure (residential, commercial, industrial, etc.) and the structure operators desired level of illumination. In general, the user-defined threshold lumen output will be at least 10 $lm/m^2$ with at least 15 $lm/m^2$ being more preferred, at least 20 $lm/m^2$ being still more preferred, and at least 25 $lm/m^2$ being most preferred. In some embodiments, the user-defined threshold lumen output may be no greater than 1,500 $lm/m^2$ with no greater than 1,000 $lm/m^2$ being more preferred, no more than 500 $lm/m^2$ being still more preferred, and no more than 100 $lm/m^2$ being most preferred. The user-defined threshold lumen output may further be defined as being in a range selected from the group consisting of between 10 $lm/m^2$ and 1,500 $lm/m^2$, between 10 $lm/m^2$ and 1,000 $lm/m^2$, between 10 $lm/m^2$ and 500 $lm/m^2$, between 10 $lm/m^2$ and 100 $lm/m^2$, between 15 $lm/m^2$ and 1,500 $lm/m^2$, between 15 $lm/m^2$ and 1,000 $lm/m^2$, between 15 $lm/m^2$ and 500 $lm/m^2$, between 15 $lm/m^2$ and 100 $lm/m^2$, between 20 $lm/m^2$ and 1,500 $lm/m^2$, between 20 $lm/m^2$ and 1,000 $lm/m^2$, between 20 $lm/m^2$ and 500 $lm/m^2$, between 20 $lm/m^2$ and 100 $lm/m^2$, between 25 $lm/m^2$ and 1,500 $lm/m^2$, between 25 $lm/m^2$ and 1,000 $lm/m^2$, between 25 $lm/m^2$ and 500 $lm/m^2$, and between 25 $lm/m^2$ and 100 $lm/m^2$.

Figure 1:
FIG. 1 depicts an aerial photograph of a surface with each pixel of the aerial photograph having a lumen output.

The method may also include photographing the surface from a second altitude which is not at ground level. The second altitude may be in the range of 60 m to 3,050 m with a second altitude in the range of between 450 m and 1,050 m being preferred. In this regard, the photograph may be thought of as an "aerial photograph" an example of which is shown in FIG. 1. The aerial photograph shown in FIG. 1 was taken using a digital camera having a single lens reflex with a 20 megapixel resolution, 35 mm equivalent focal length, and 6400 ISO, 1/800 shutter speed. The aerial photograph shown in FIG. 1 was taken by an aircraft traveling at 120 kts at approximately 2,000 feet above ground level.

The "aerial photograph" may be taken from any number of aerial vehicles including—but not limited to—an airplane, a helicopter, and a drone. The aerial photograph may be taken by an optical camera mounted to the aerial vehicle. Preferably, the optical camera will be mounted to the aerial vehicle with the optical camera facing downwardly from the aerial vehicle towards the ground. Most preferably, the optical camera is oriented towards the ground in a nadir position. One example of an optical camera is a Cannon 5D Series camera available from Canon Inc. of Ota, Tokyo, Japan. The optical camera preferably has a resolution of at least 4 megapixels with at least 15 megapixels being more preferred, and preferably has a shutter speed set in the range of between 1/400 seconds and 1/10000 second with between 1/450 and 1/9000 being more preferred and between 1/500 seconds and 1/8000 seconds being most preferred.

The aerial photograph will comprise a plurality of pixels with each pixel of the plurality of pixels having a unique X coordinate and Y coordinate corresponding to a specific spatial location of the pixel on the surface. The X coordinate and Y coordinate of at least one pixel of the plurality of pixels will correspond with the first location at which the first lumen output is measured. Each pixel will also have a second lumen output which may be a measure of either the amount of reflected light or the amount of incident light measured in units of lux, footcandles, candelas, lumens, or candela per square meter at each individual pixel. The preferred measurement for the second lumen output is a measure of reflected light measured in lumen per square meter ($lm/m^2$).

The steps of measuring the first lumen output and photographing the surface from a second altitude will each occur at a specific time. For example, measuring the first lumen output will occur at a first time, and photographing the surface from a second altitude will occur at a second time. It is preferred that the first time and the second time be separated by no greater than +/−15 minutes with no greater than +/−1 minute being most preferred. Preferably, each of the first time and the second time are after sunset but before sunrise with at least 1 hour after sunset and at least 1 hour before sunrise being most preferred. Sunset may sometimes be referred to as astronomical twilight while sunrise may sometimes be referred to as astronomical dawn. Astronomical twilight (or sunset) and astronomical dawn (or sunrise) refer to a time at which the geometric center of the sun is greater than 18° below the horizon, preferably greater than 20° below the horizon, and most preferably 25° below the horizon. It is also preferred that any lighting elements on or around the surface be turned on at the first time and the second time.

Figure 2:
FIG. 2 depicts the aerial photograph of the surface of FIG. 1 with the lumen output of each pixel having been subjected to an altitude adjustment.

Once the aerial photograph has been obtained, one step in the method may include conducting an altitude adjustment on the second lumen output of the aerial photograph. The second lumen output may be conducted in order to provide a visual image of the surface showing a more accurate depiction of the illumination of the surface. The result of the altitude adjustment on the second lumen output may be thought of as a third lumen output. An example of an aerial photograph in which an altitude adjustment on the second lumen output has been conducted is shown in FIG. 2.

The altitude adjustment may be conducted according to the following formula:

$$E_1 = (d_1/d_2)^2 \times E_2$$

where $E_1$ is the third lumen output, $d_1$ is the second altitude, $d_2$ is the first altitude, and $E_2$ is the first lumen output. The altitude adjustment may be conducted on each pixel of the plurality of pixels or may be conducted on less than each pixel of the plurality of pixels. It is preferred that the altitude adjustment be conducted on at least 95% of the pixels of the plurality of pixels with at least 99% of the pixels of the plurality of pixels being more preferred and 100% of the pixels of the plurality of pixels being most preferred.

Figure 3:
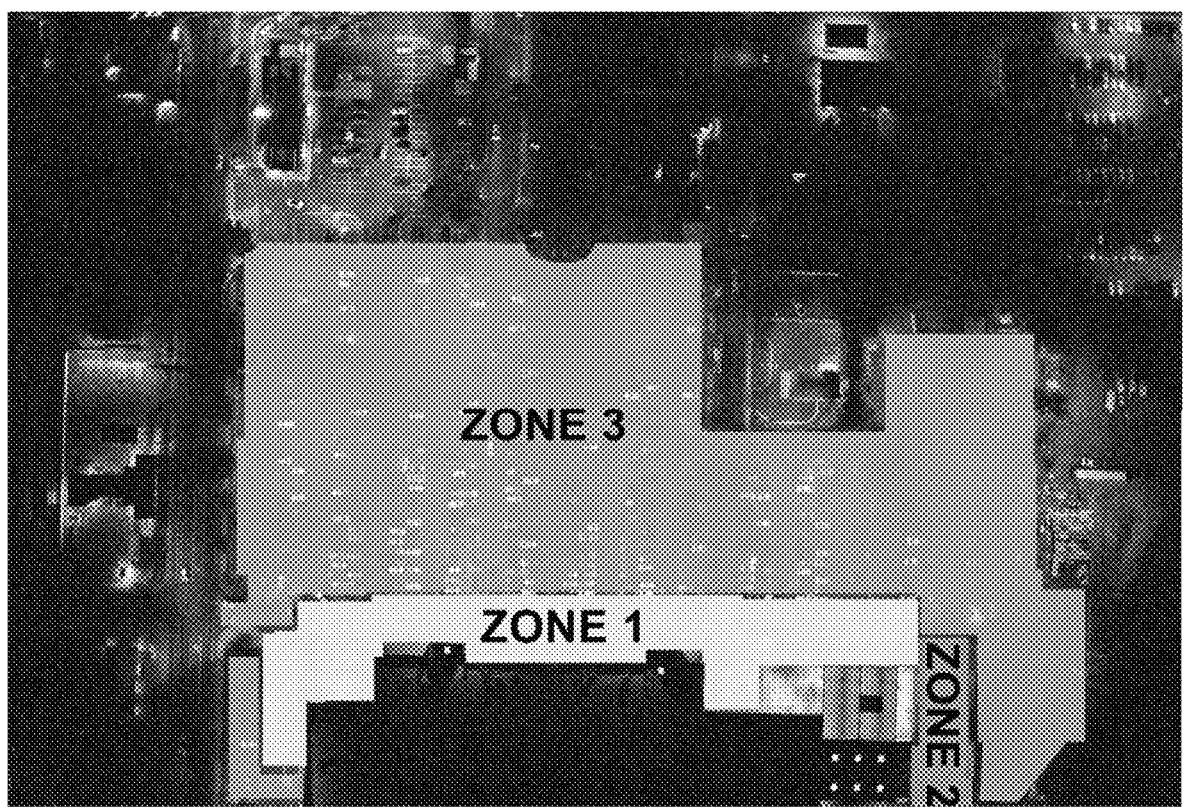
FIG. 3 depicts the aerial photograph subjected to an altitude adjustment of FIG. 2 divided into a plurality of zones.

The method may also comprise dividing the aerial photograph into a plurality of zones with each zone corresponding to a section of the surface and comprising a total number of pixels of the plurality of pixels. The section of the surface to which each zone corresponds may include different features at or around the surface. Examples of such features may include a parking lot, a driveway, a pedestrian walkway, the exterior walls of a structure, a landscaping bed, a tree line, and a canopy. In practice, the number of zones and the type of features will vary depending upon the unique outlay of the surface. An example of an aerial photograph divided into a plurality of zones is shown in FIG. 3.

In some embodiments, each zone of the plurality of zones may have a different user-defined threshold lumen output. For example, zones corresponding to exterior walls of a structure—particularly those around entryways—may have a higher user-defined threshold lumen output in the range of between 25 lm/m² and 1,500 lm/m². By comparison, zones corresponding to driveways in which illumination is typically assisted by headlights of vehicles traveling through the driveway may have a lower user-defined threshold lumen output in the range of between 10 lm/m² and 100 lm/m².

The method may also comprise identifying a percentage of the total number of pixels in each zone of the plurality of zones which meet or exceed the user-defined threshold lumen output for the particular zone in question. This may be done to identify zones which require remediation efforts to improve the surface illumination in that area. For example, when less than 50%, less than 75%, less than 90%, less than 95%, less than 99%, or less than 100% of the total number of pixels in a particular zone meet or exceed the user-defined threshold lumen output for that zone, then remediation efforts may be required. The threshold percentage in each zone which calls for remediation efforts will vary depending upon a number of factors including, but not limited to, the type of surface features within the individual zone. For example, zones corresponding to exterior walls of a structure—particularly those around entryways—may require remediation efforts when less than 95%, less than 99%, or less than 100% of the total number of pixels in that zone meet or exceed the user-defined threshold lumen output for that zone. By comparison, zones corresponding to driveways in which illumination is typically assisted by headlights of vehicles traveling through the driveway may require remediation efforts when less than 50%, less than 75%, or less than 90% of the total number of pixels in that zone meet or exceed the user-defined threshold lumen output for that zone. Remediation efforts may include adding one or more lighting elements to a location within the zone, changing to higher output lightbulbs in one or more lighting elements located within the zone, replacing burnt-out lightbulbs in one or more lighting elements located within the zone, removing physical barriers such as canopies, trees, or other vegetation located within the zone, and/or redirecting the light by adjusting the angle or height of one or more lighting element(s) within the zone.

One of ordinary skill will recognize that, in certain embodiments, the step of photographing the surface to obtain an aerial photograph may be repeated at subsequent times. This step may be repeated to re-evaluate the artificial lighting of the surface—such as after remediation efforts have taken place, or after a period of time to ensure that the artificial lighting of the surface remains adequate. The step of measuring the first lumen output at the first location may not need to be repeated when photographing the surface to obtain an aerial photograph at a subsequent time. The subsequent aerial photograph may be taken at a time in a range selected from the group consisting of between 12 hours and 10 years after the first time at which the first lumen output at the first location was measured, between 12 hours and 5 years after the first time at which the first lumen output at the first location was measured, between 12 hours and 3 years after the first time at which the first lumen output at the first location was measured, between 12 hours and 2 years after the first time at which the first lumen output at the first location was measured, and between 12 hours and 1 year after the first time at which the first lumen output at the first location was measured.

What is claimed is:

1. A method of evaluating artificial lighting of a surface comprising the steps of:
    A. measuring a first lumen output at a first location on the surface at a first altitude in a range of between 0.5 m and 6.5 m;
    B. photographing the surface from a second altitude in a range of between 60 m and 3,050 m to obtain an aerial photograph of the surface, said aerial photograph comprising a plurality of pixels, wherein each pixel of the plurality of pixels has an X coordinate and a Y coordinate corresponding to a specific spatial location of the pixel on the surface, wherein each pixel of the plurality of pixels has a second lumen output, and wherein the X coordinate and the Y coordinate of at least one pixel of the plurality of pixels corresponds with the first location;
    C. conducting an altitude adjustment on the second lumen output according to the formula $E_1=(d_1/d_2)^2 \times E_2$ to obtain a third lumen output where $E_1$ is the third lumen output, $d_1$ is the second altitude, $d_2$ is the first altitude, and $E_2$ is the first lumen output;
    D. dividing the aerial photograph into a plurality of zones wherein each zone corresponds to a section of the surface and comprises a total number of pixels from the plurality of pixels;
    E. establishing a user-defined threshold lumen output for each zone of the plurality of zones wherein the user-defined threshold lumen output for each zone is independently in the range of between 10 lm/m² and 1,500 lm/m² when measured at the first altitude, and
    F. identifying a percentage of the total number of pixels in each zone of the plurality of zones which meet or exceed the user-defined threshold lumen output by comparing the third lumen output of each pixel to the first lumen output; and wherein the step of measuring the first lumen output occurs at a first time, the step of photographing the surface from the second altitude occurs at a second time, and the first time and the second time are separated by no greater than +/−15 minutes.

2. The method of claim 1, wherein the first altitude is in a range of between 1.2 m and 2.15 m.

3. The method of claim 2, wherein the second altitude is in a range of between 450 m and 1,050 m.

4. The method of claim 2, wherein the first time and the second time are separated by no greater than +/−1 minute.

5. The method of claim 2, wherein the first time and the second time are each after astronomical twilight and before astronomical dawn.

6. The method of claim 2, wherein the first time and the second time are in the range of between at least 1 hour after astronomical twilight and at least 1 hour before astronomical dawn.

7. The method of claim 2, further comprising the steps of:
G. taking at least one subsequent aerial photograph of the surface from the second altitude wherein the subsequent aerial photograph comprises a subsequent plurality of pixels, wherein each pixel of the subsequent plurality of pixels has an X coordinate and a Y coordinate corresponding to a specific spatial location of the pixel on the surface, wherein each pixel of the plurality of pixels has a subsequent lumen output, and wherein the X coordinate and the Y coordinate of at least one pixel of the plurality of subsequent pixels corresponds with the first location;
H. conducting a subsequent altitude adjustment on the subsequent lumen output according to the formula $E_1=(d_1/d_2)^2 \times E_2$ to obtain a fourth lumen output where $E_1$ is the fourth lumen output, $d_1$ is the second altitude, $d_2$ is the first altitude, and $E_2$ is the first lumen output;
I. dividing the subsequent aerial photograph into a subsequent plurality of zones wherein each zone corresponds to a section of the surface and comprises a total number of pixels from the subsequent plurality of pixels; and
J. identifying a percentage of the total number of pixels in each zone of the subsequent plurality of zones which meet or exceed the user-defined threshold lumen output by comparing the fourth lumen output of each subsequent pixel to the first lumen output; and wherein the subsequent aerial photograph is taken at a time which is in a range selected from the group consisting of between 12 hours and 10 years after the first time at which the first lumen output at the first location was measured, between 12 hours and 5 years after the first time at which the first lumen output at the first location was measured, between 12 hours and 3 years after the first time at which the first lumen output at the first location was measured, between 12 hours and 2 years after the first time at which the first lumen output at the first location was measured, and between 12 hours and 1 year after the first time at which the first lumen output at the first location was measured.

8. The method of claim 1, wherein the second altitude is in a range of between 450 m and 1,050 m.

9. The method of claim 8, wherein the first time and the second time are separated by no greater than +/−1 minute.

10. The method of claim 8, wherein the first time and the second time are each after astronomical twilight and before astronomical dawn.

11. The method of claim 8, wherein the first time and the second time are in the range of between at least 1 hour after astronomical twilight and at least 1 hour before astronomical dawn.

12. The method of claim 8, further comprising the steps of:
G. taking at least one subsequent aerial photograph of the surface from the second altitude wherein the subsequent aerial photograph comprises a subsequent plurality of pixels, wherein each pixel of the subsequent plurality of pixels has an X coordinate and a Y coordinate corresponding to a specific spatial location of the pixel on the surface, wherein each pixel of the plurality of pixels has a subsequent lumen output, and wherein the X coordinate and the Y coordinate of at least one pixel of the plurality of subsequent pixels corresponds with the first location;
H. conducting a subsequent altitude adjustment on the subsequent lumen output according to the formula $E_1=(d_1/d_2)^2 \times E_2$ to obtain a fourth lumen output where $E_1$ is the fourth lumen output, $d_1$ is the second altitude, $d_2$ is the first altitude, and $E_2$ is the first lumen output;
I. dividing the subsequent aerial photograph into a subsequent plurality of zones wherein each zone corresponds to a section of the surface and comprises a total number of pixels from the subsequent plurality of pixels; and
J. identifying a percentage of the total number of pixels in each zone of the subsequent plurality of zones which meet or exceed the user-defined threshold lumen output by comparing the fourth lumen output of each subsequent pixel to the first lumen output; and wherein the subsequent aerial photograph is taken at a time which is in a range selected from the group consisting of between 12 hours and 10 years after the first time at which the first lumen output at the first location was measured, between 12 hours and 5 years after the first time at which the first lumen output at the first location was measured, between 12 hours and 3 years after the first time at which the first lumen output at the first location was measured, between 12 hours and 2 years after the first time at which the first lumen output at the first location was measured, and between 12 hours and 1 year after the first time at which the first lumen output at the first location was measured.

13. The method of claim 1, wherein the first time and the second time are separated by no greater than +/−1 minute.

14. The method of claim 13, wherein the first time and the second time are each after astronomical twilight and before astronomical dawn.

15. The method of claim 13, wherein the first time and the second time are in the range of between at least 1 hour after astronomical twilight and at least 1 hour before astronomical dawn.

16. The method of claim 13 further comprising the steps of:
G. taking at least one subsequent aerial photograph of the surface from the second altitude wherein the subsequent aerial photograph comprises a subsequent plurality of pixels, wherein each pixel of the subsequent plurality of pixels has an X coordinate and a Y coordinate corresponding to a specific spatial location of the pixel on the surface, wherein each pixel of the plurality of pixels has a subsequent lumen output, and wherein the X coordinate and the Y coordinate of at least one pixel of the plurality of subsequent pixels corresponds with the first location;

H. conducting a subsequent altitude adjustment on the subsequent lumen output according to the formula $E_1=(d_1/d_2)^2 \times E_2$ to obtain a fourth lumen output where $E_1$ is the fourth lumen output, $d_1$ is the second altitude, $d_2$ is the first altitude, and $E_2$ is the first lumen output;

I. dividing the subsequent aerial photograph into a subsequent plurality of zones wherein each zone corresponds to a section of the surface and comprises a total number of pixels from the subsequent plurality of pixels; and J. identifying a percentage of the total number of pixels in each zone of the subsequent plurality of zones which meet or exceed the user-defined threshold lumen output by comparing the fourth lumen output of each subsequent pixel to the first lumen output; and wherein the subsequent aerial photograph is taken at a time which is in a range selected from the group consisting of between 12 hours and 10 years after the first time at which the first lumen output at the first location was measured, between 12 hours and 5 years after the first time at which the first lumen output at the first location was measured, between 12 hours and 3 years after the first time at which the first lumen output at the first location was measured, between 12 hours and 2 years after the first time at which the first lumen output at the first location was measured, and between 12 hours and 1 year after the first time at which the first lumen output at the first location was measured.

17. The method of of claim 1, wherein the first time and the second time are each after astronomical twilight and before astronomical dawn.

18. The method of claim 17, wherein the first time and the second time are in the range of between at least 1 hour after astronomical twilight and at least 1 hour before astronomical dawn.

19. The method of claim 1, wherein the first time and the second time are in the range of between at least 1 hour after astronomical twilight and at least 1 hour before astronomical dawn.

20. The method of claim 1, further comprising the steps of:

G. taking at least one subsequent aerial photograph of the surface from the second altitude wherein the subsequent aerial photograph comprises a subsequent plurality of pixels, wherein each pixel of the subsequent plurality of pixels has an X coordinate and a Y coordinate corresponding to a specific spatial location of the pixel on the surface, wherein each pixel of the plurality of pixels has a subsequent lumen output, and wherein the X coordinate and the Y coordinate of at least one pixel of the plurality of subsequent pixels corresponds with the first location;

H. conducting a subsequent altitude adjustment on the subsequent lumen output according to the formula $E_1=(d_1/d_2)^2 \times E_2$ to obtain a fourth lumen output where $E_1$ is the fourth lumen output, $d_1$ is the second altitude, $d_2$ is the first altitude, and $E_2$ is the first lumen output;

I. dividing the subsequent aerial photograph into a subsequent plurality of zones wherein each zone corresponds to a section of the surface and comprises a total number of pixels from the subsequent plurality of pixels; and J. identifying a percentage of the total number of pixels in each zone of the subsequent plurality of zones which meet or exceed the user-defined threshold lumen output by comparing the fourth lumen output of each subsequent pixel to the first lumen output; and wherein the subsequent aerial photograph is taken at a time which is in a range selected from the group consisting of between 12 hours and 10 years after the first time at which the first lumen output at the first location was measured, between 12 hours and 5 years after the first time at which the first lumen output at the first location was measured, between 12 hours and 3 years after the first time at which the first lumen output at the first location was measured, between 12 hours and 2 years after the first time at which the first lumen output at the first location was measured, and between 12 hours and 1 year after the first time at which the first lumen output at the first location was measured.

* * * * *